Patented Aug. 7, 1934

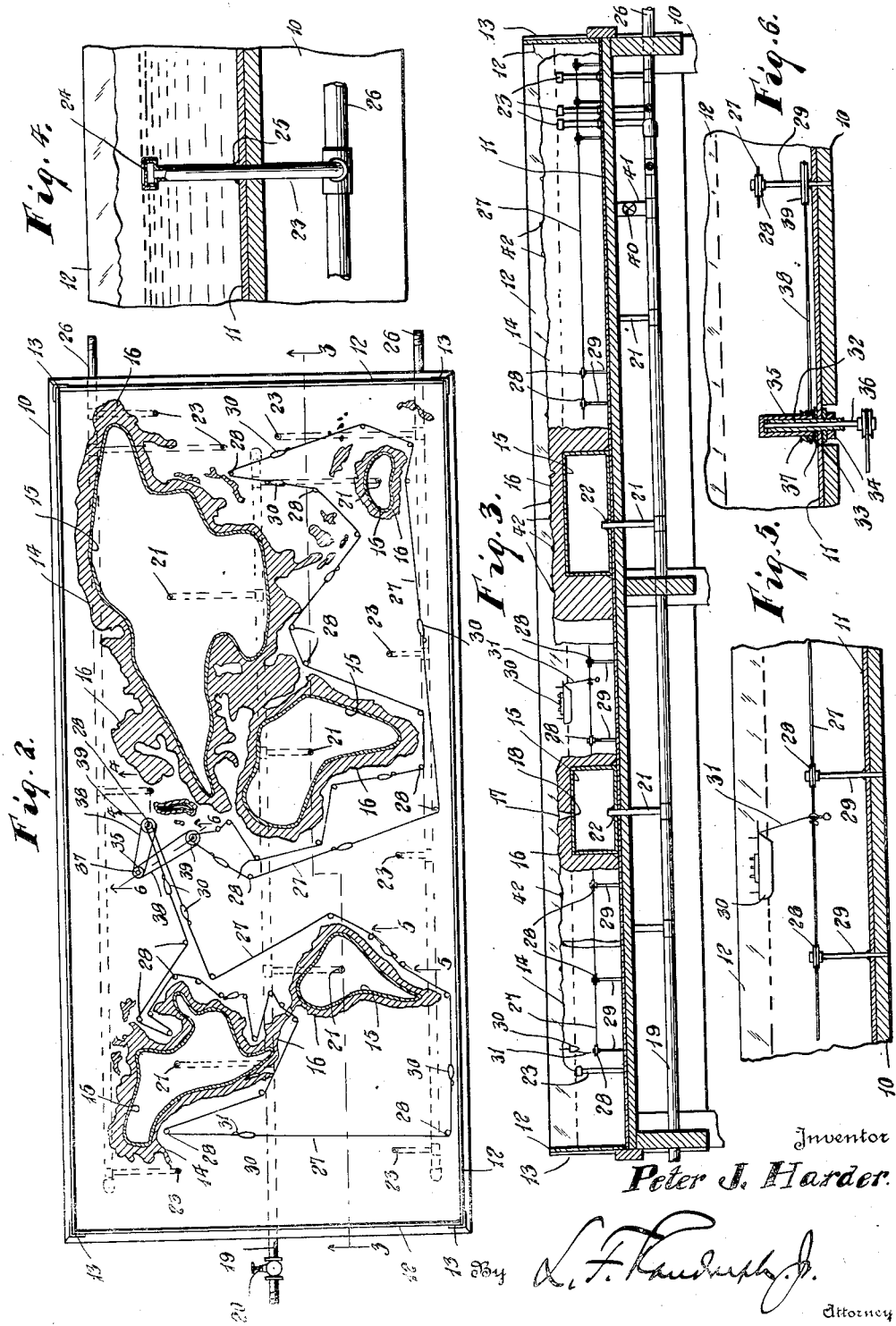

1,969,607

UNITED STATES PATENT OFFICE 1,969,607

MAP

Peter J. Harder, Osler, Saskatchewan, Canada

Application September 28, 1933, Serial No. 691,385

7 Claims. (Cl. 35—6)

This invention relates to an educational device or structure having the aspect of a map and includes a model of land areas and an aquarium and is primarily designed for use in teaching geography, history, current events, nature study and the like.

It is primarily designed to provide a novel construction wherein water will flow in simulation of oceans, lakes, rivers or other bodies over continents, portions thereof, islands, or the like, wherein miniature ships will travel over simulated routes and wherein water will flow in directions according to the current flow of the actual body or bodies of water represented.

The more specific objects and advantages will become apparent from a consideration of the description following taken in connection with accompanying drawings illustrating an operative embodiment.

In said drawings:—

Figure 1 is a perspective view of the apparatus constructed in accordance with the invention, Figure 2 is a plan view of such apparatus, Figure 3 is a longitudinal sectional view taken on the line 3—3 of Figure 1, Figure 4 is an enlarged detail sectional view taken on the line 4—4 of Figure 2, Figure 5 is a detail sectional view taken on the line 5—5 of Figure 2, and Figure 6 is a detail sectional view taken on the line 6—6 of Figure 2.

Referring specifically to the drawings, the apparatus is built of any desired materials and of any suitable size, utilizing a stand or table or solid base as at 10 having its top covered with metal as at 11 and bordered at all sides by vertical walls 12, preferably of transparent glass, and connected at the corners 13 in a water-proof manner and also connected to the metal plate 11 in a water-proof manner.

As best shown in Figure 1, the continents, and islands are represented at 14 in map fashion, the same projecting above the plate 11 or bottom of the tank or aquarium formed by the walls 11 and 12. Between the members 14, the tank contains water which simulates the oceans, lakes, and rivers.

Reverting to said portions 14, various auxiliary tanks 15 are disposed on the wall 11 and about the same, cementitious or plastic matter 16 is applied in order to give the continents, islands or the like a shape more nearly approaching that found in nature.

The upper surfaces of the material 16 is formed to represent mountains, valleys, rivers, lakes and the like, and the rivers and lakes are simulated by grooves or depressions as at 17 in communication with the interior of the tanks 15 through outlet ports 18 in the top of the latter.

A main water supply pipe is shown at 19 having a cut off valve 20 therein. Such pipe 19 communicates with a source of water under pressure or at a level above that of the device so that water will flow at the regulated velocity through the pipe 19, which is suitably supported on the table 10, and thence through branches 21 into the tanks 15, with which they are connected as at 22 in a water-tight manner, the water thence flowing through the ports or the like 18, grooves 17 and between the continents 14. The water can only rise to a predetermined level slightly below that of the continents 14 since various drain pipes 23 are provided, covered at their top as at 24 with screens or sieves, such drain pipes 23 extending through the tank wall 11 in a water-tight manner as at 25, by soldering thereto or the like and the drain pipe 24 leading to one or more waste pipes 26. Said drain pipes 23 are arranged at any suitable locations in the water portions and they particularly perform the function of controlling the direction of flow of the water so that the various ocean currents and the like will be simulated in the device.

Various steamship routes may also be simulated in the device by the movement of endless cables 27, two being shown for example, although any desired number may be employed. Said cables 27 are flexible and trained over and governed as to speed by pulleys 28 journaled on shafts 29 secured in a water-tight manner within the tank or aquarium. Said cables 27 move ships or vessels 30 in the water, the same being tethered or connected by cords or flexible elements 31 to the cables 27 so as to be drawn by the latter over courses simulating ocean routes for steamships, such ships 30 being capable of carrying miniature representations of products from any portion or various portions of the globe.

In order to move the cables 27 at the desired speed, a pipe 32 extends into the tank through the wall 11, being connected thereto in a water-tight manner and preferably removably. To this end flexible gaskets 33 telescope over the pipe 32 and the lower end being held in contact with the wall 11 by a nut 34 secured on the pipe. A cap 35 extends over the pipe 32 within the tank and has contact with the gaskets 33. Cap pipe 35 is rotatable and is connected with a drive shaft 36 which extends upwardly through and is journaled in the pipe 32. Such shaft 36 is adapted to be rotated at any desired speed and from any suitable source of power, for instance by an electric motor, (not shown), supported on the table 10. The cap 35 carries two pulleys 37 over which endless belts 38 are trained, one being also trained over a pulley 39 on one of the shafts 29 and the other being trained over a pulley 39 on a shaft 29 associated with the other endless cable.

When it is desired to completely drain the tanks, a valve 40 may be opened, enabling the water to pass through an outlet pipe 41 connected in a water-tight manner to the wall 11, through one of the pipes 26.

Cities, ports, or prominent places may be delineated upon the continents or the like 14 as at 42 by means of small pearls, jewels, stones, or other projections.

Attention is directed to the fact that all parts are finished as realistic to nature as practical by coloring and so forth, for instance, dry and barren regions being colored brown and sand color, forests and fertile regions being colored green, cold and snow covered regions being colored white and other parts being in blended colors. Main railways may be represented in any conventional manner. Products of the soil, principal industries, and the like may be represented also on the continents or the like 14.

Colored cut-outs from aluminum or the like representing different races of men, domestic animals, wild animals, and to show industrial, social and commercial life may be used and placed about the continents and water. The ocean bottoms are covered with sea shells, thick layers at places to show correctly different ocean depths, pieces of coral may be fastened at correct places to show coral islands and coral reefs. Also real portions of sponges may be fastened to the bottom of seas and oceans to show sponge production. Historical events may be shown at correct places with the cut-outs referred to. Colored lines may also be delineated at the bottom of the oceans to represent parallels and meridians, the equator and the dividing lines between the zones.

In the water, gold fish, other water creatures and even water plants for nature study may be kept so that the device functions fully as an aquarium.

Various changes may be resorted to provided they fall within the spirit and scope of the invention.

I claim as my invention:—

1. An instruction device having a hollow portion in imitation of land area, a container for liquid associated therewith, said hollow portion having a top provided with an opening therethrough, means for the supply of liquid through said portion and opening to flow across said portion and drain into the container, and means for the withdrawing of said liquid out of the container thereby causing movement of the liquid in the container.

2. An instruction device comprising a container, a body in imitation of land area having a tank within the same provided with an opening in the top, means for the flow of water through the tank and opening, said body having a depression in its top in discharge communication with the opening, and said depression being in communication with the container.

3. An instruction device having a body in imitation of land area, a tank within said body, said body having a depression in its top to represent a river or the like arranged in discharge communication with said tank, and means to supply water through the tank and into the depression.

4. An instruction device having a body in imitation of land area, a tank within said body, said body having a depression in its top to represent a river or the like arranged in discharge communication with said tank, means to supply water through the tank and into the depression, a container into which the depression discharges, and drainage means in the container controlling the water level.

5. An instruction device having a container, means to cause the flow of water in the container, means in the container in imitation of land area through which the water rises and then flows into the tank, a floating miniature vessel in the water, and means below the water level to move the miniature vessel in the water in simulation of a vessel following a trade route, and a tethering connection between the object and last means enabling the object to be influenced by the flow of water in the container.

6. An instruction device comprising a container, means to cause the flow of water in the container, a float in the water in the form of a miniature vessel, movable means below the level of the water including a tethered connection to the float operable to move the float in simulation of a vessel following a trade route and subject it to the influence of the flow of the water.

7. A device of the class described comprising a container, bodies therein in imitation of land area comprising tanks, matter molded over the tanks to define continents and the like, said molded matter containing depressions to simulate rivers, and the like into which water rises from said tanks, the space between the bodies representing oceans and the like to contain water draining from the depressions, means to supply water to the tanks, means for the drainage of water from the container to control the water level, movable cables within the container below the water level arranged in simulation of trade routes, guide means for the cables, floating objects in the water simulating vessels following trade routes individually tethered to the cables so as to be operated thereby and be influenced by the flow of the water in the container.

PETER J. HARDER.